US012736029B2

(12) United States Patent
Ben Gharbia et al.

(10) Patent No.: US 12,736,029 B2
(45) Date of Patent: Sep. 15, 2026

(54) METHOD FOR CONTROLLING A WIND FARM BY MEANS OF AN OPTIMIZATION METHOD

(71) Applicant: IFP Energies nouvelles, Rueil-Malmaison (FR)

(72) Inventors: Ibtihel Ben Gharbia, Rueil-Malmaison Cedex (FR); Paul Malisani, Rueil-Malmaison Cedex (FR); Fabrice Guillemin, Rueil-Malmaison Cedex (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 269 days.

(21) Appl. No.: 18/624,281

(22) Filed: Apr. 2, 2024

(65) Prior Publication Data

US 2024/0337250 A1 Oct. 10, 2024

(30) Foreign Application Priority Data

Apr. 6, 2023 (FR) ...................................... 2303434

(51) Int. Cl.
*F03D 7/04* (2006.01)
*F03D 7/02* (2006.01)

(52) U.S. Cl.
CPC ........... *F03D 7/048* (2013.01); *F03D 7/0204* (2013.01); *F05B 2260/821* (2013.01); (Continued)

(58) Field of Classification Search
None
See application file for complete search history.

(56) References Cited

U.S. PATENT DOCUMENTS 9,201,410 B2 12/2015 Ambekar et al.
2012/0279288 A1* 11/2012 Frederiksen ........... F03D 7/048 73/112.01

(Continued)

FOREIGN PATENT DOCUMENTS

CN 108869173 A * 11/2018 ............ F03D 7/043
CN 110397553 A * 11/2019 ............ F03D 7/028

(Continued)

OTHER PUBLICATIONS

Howland et al., “Wind farm power optimization through wake steering”, PNAS, Jul. 16, 2019, vol. 116, No. 29, 14495-14500. (Year: 2019).*

(Continued)

*Primary Examiner* — Mohammad Ali
*Assistant Examiner* — Kelvin Booker
(74) *Attorney, Agent, or Firm* — FITCH, EVEN, TABIN & FLANNERY, LLP

(57) ABSTRACT

The present invention is a wind farm control method implementing an acquisition (ACQ) of a wind speed and direction distribution, an acquisition of the wind speed and direction in real time (Vac), a wind farm model (MOD F) and a load model (MOD C) for each wind turbine. Finally, an optimization step (OPT) allows target operating points to be determined for each turbine. The optimization step implements optimization of an expected value of the energy generated for the entire wind speed and a direction distribution according to an expected value of the load of each turbine for the entire wind speed and direction distribution. The target operating points (target yaw angles for example) are then applied to the turbines of the wind farm (CON).

20 Claims, 4 Drawing Sheets

(52) U.S. Cl.
CPC ..... *F05B 2270/111* (2013.01); *F05B 2270/32* (2013.01); *F05B 2270/321* (2013.01)

(56) References Cited

U.S. PATENT DOCUMENTS

| | | | | |
|---|---|---|---|---|
| 2014/0037447 | A1* | 2/2014 | Attia | F03D 7/0204 416/9 |
| 2016/0146190 | A1* | 5/2016 | Ravindra | F03D 9/257 290/44 |
| 2017/0284368 | A1* | 10/2017 | Franke | F03D 7/0292 |
| 2017/0342961 | A1* | 11/2017 | Saxena | F03D 13/00 |
| 2017/0356421 | A1* | 12/2017 | Petitjean | G05B 19/042 |
| 2018/0073486 | A1* | 3/2018 | Zhang | F03D 7/048 |
| 2021/0054825 | A1* | 2/2021 | Yu | F03D 7/0224 |
| 2023/0034766 | A1* | 2/2023 | Evans | F03D 7/048 |

FOREIGN PATENT DOCUMENTS

| | | | | | |
|---|---|---|---|---|---|
| CN | 111881572 | A | * | 11/2020 | F03D 7/00 |
| CN | 112459965 | A | * | 3/2021 | F03D 17/00 |
| CN | 114818511 | A | * | 7/2022 | G06F 30/18 |
| CN | 115333168 | A | * | 11/2022 | H02J 3/381 |
| CN | 115467793 | A | * | 12/2022 | F03D 7/0204 |
| CN | 115807734 | A | * | 3/2023 | F03D 17/00 |
| CN | 118327886 | A | * | 7/2024 | F03D 17/001 |
| EP | 2940296 | A1 | * | 11/2015 | F03D 7/048 |
| ES | 2667818 | T3 | * | 5/2018 | F03D 9/257 |
| ES | 2880783 | T3 | * | 11/2021 | F03D 7/043 |
| ES | 2939136 | T3 | * | 4/2023 | F03D 7/048 |
| FR | 2212772 | | | 7/1974 | |
| JP | 2018035706 | A | * | 3/2018 | F03D 7/0264 |
| KR | 102406851 | B1 | * | 6/2022 | F03D 7/048 |
| WO | WO-2018236375 | A1 | * | 12/2018 | F03D 7/048 |
| WO | WO-2019184171 | A1 | * | 10/2019 | F03D 7/045 |

OTHER PUBLICATIONS

Kanev, S., Dynamic wake steering and its impact on wind farm power production and yaw actuator duty, Nov. 2018, Renewable Energy 146. (Year: 2018).*

Zong et al., "Experimental investigation and analytical modelling of active yaw control for wind farm power optimization", Nov. 2020, Renewable Energy 170. (Year: 2020).*

Gebraad et al., "Wind plant power optimization through yaw control using a parametric model for wake effects—a CFD simulation study", Wind Energy Wind Energ. 2014, 00:1-20, DOI: 10.1002/we. (Year: 2014).*

Dou et al., "Optimization of wind turbine yaw angles in a wind farm using a three-dimensional yawed wake model", Feb. 2020, Energy 209 (2020) 118415. (Year: 2020).*

Dar et al., "Windfarm Power Optimization Using Yaw Angle Control", IEEE Transactions on Sustainable Energy, vol. 8, No. 1, Jan. 2017. (Year: 2017).*

Bastankhah et al., "Wind farm power optimization via yaw angle control: A wind tunnel study", Oct. 2018, J. Renewable Sustainable Energy 11, 023301. (Year: 2018).*

Abdelouahad et al., "New approach for optimizing the yaw of a wind farm using the random algorithm", 2022, IEEE. Bellat (Year: 2022).*

French Patent Office; Preliminary Research Report in corresponding French Application No. 2303434, dated Oct. 20, 2023; 4 pages.

Kanevstoyan, E.., et al., "Dynamic wake steering and its impact on wind farm power production and yaw actuator duty", Renewable Energy, Pergamon Press, Oxford, GB, vol. 146, Jun. 25, 2019 (Jun. 25, 2019), pp. 9-15, XP085904430, ISSN: 0960-1481, DOI: 10.1016/J.RENENE.2019.06.122 [retrieved Jun. 25, 2019], 7 pages.

Sun Jili et al: "Multi-Objective Offshore 1-10 Wind Farm Wake Redirection Optimization for Power Maximization and Load", National Registration No. FA 917751 FR 2303434, 2022 American Control Conference (ACC), American Automatic Control Council, Jun. 8, 2022 (Jun. 8, 2022), pp. 5235-5240, XP034179434, DOI: 10.23919/ACC53348.2022.9867822 [Retrieved Sep. 5, 2022], 6 pages.

* cited by examiner

METHOD FOR CONTROLLING A WIND FARM BY MEANS OF AN OPTIMIZATION METHOD

CROSS-REFERENCE TO RELATED APPLICATIONS

Reference is made to French Patent Application No. 2303434 filed Apr. 6, 2023, which is incorporated herein by reference in its entirety.

BACKGROUND OF THE INVENTION

Field of the Invention

The present invention relates to field of wind farm control for maximizing the generated power and for reducing wind turbine fatigue.

Description of the Prior Art

A wind farm, also referred to as wind park or wind power plant, is a site comprising wind turbines that produce electricity. This site may be located either onshore or offshore. A distinction is thus made between onshore wind farms and offshore wind farms, which are those at sea.

The wind turbines of these farms are generally horizontal-axis turbines provided with a system for orienting the horizontal rotational axis in the direction of the wind to maximize the energy recovered by the turbine. A wind turbine allows the kinetic energy from the wind to be converted into electrical or mechanical energy. For wind energy conversion to electrical energy, it is made up of the following elements:

- a tower allowing a rotor to be positioned at a sufficient height to enable motion thereof (necessary for horizontal-axis wind turbines) or allowing this rotor to be positioned at a height enabling it to be driven by a stronger and more regular wind than at ground level. The tower possibly houses part of the electrical and electronic components (modulator, control, multiplier, generator, etc.),
- a nacelle mounted at the top of the tower, housing mechanical, pneumatic components, some electrical and electronic components necessary to operate the machine (modulator, control, multiplier, generator, etc.). The nacelle can rotate to orient the rotor in the right direction,
- a rotor fastened to the nacelle, comprising blades (generally three) and the hub of the wind turbine. The rotor is driven by the wind energy and it is connected by a mechanical shaft, directly or indirectly (via a gearbox and mechanical shaft system), to an electrical machine (electric generator) that converts the energy recovered to electrical energy. The rotor is potentially provided with control systems such as a variable-angle blades or aerodynamic brakes,
- possibly a transmission, notably made up of two shafts (mechanical shaft of the rotor and mechanical shaft of the electric machine) connected by a multiplier (gearbox).

Since the early 1990s, there has been renewed interest in wind power, in particular in the European Union where the annual growth rate is about 20%. This growth is attributed to the inherent possibility for carbon-free electricity generation. In order to sustain this growth, the energy yield of wind turbines and wind farms still needs to be further improved. The prospect of wind power production increase requires developing effective production tools and advanced control tools in order to improve the performances of the machines. Wind turbines are designed to generate electricity at the lowest possible cost.

For this power regulation, controllers have been designed for variable-speed aerogenerators. The purpose of the controllers is to maximize the electric power recovered, to minimize the rotor speed fluctuations, and to minimize the fatigue and extreme moments of the structure (blades, tower and platform).

Wind farms are subject to a phenomenon commonly referred to as "wake effect", when the disturbances generated by turbines located upstream from the wind park create suboptimal electricity generation conditions for the other turbines. Indeed, a turbulent wake forms downstream from the turbine, and the average wind speed is decreased in this wake because the turbine has captured part of the kinetic energy of the wind, and the intensity of the turbulence is increased.

A common strategy for maximizing the energy generation of a wind turbine orientates the rotor thereof so that it faces the wind. The angle between the rotor and the wind direction, known as yaw angle, is then 0°. FIG. 1 schematically illustrates the yaw angle by way of non-limitative example. FIG. 1 is a top view of a wind turbine. The turbine comprises blades 1 and a nacelle 2, oriented in a direction AA. The wind is represented by arrow U having a direction DD. The angle $\gamma$ between direction AA and direction DD is the yaw angle. When the rotor of the turbine is aligned with the wind direction, this angle $\gamma$ is zero.

However, in wind parks, applying this strategy (zero yaw angle) to all the turbines, according to a method referred to as "greedy", makes the park subject to the so-called wake effect: when a wind turbine extracts energy from the wind, the downstream wind speed decreases and its turbulence increases. This leads to suboptimal conditions for the energy generation of turbines located downstream, and the total production losses can reach 40% at sea. A certain number of controllable actuators can be used to reduce this effect which are the power capture which can be impacted by controlling the orientation of the blades or the generator torque, the wake of a turbine can be deflected below the downstream turbines by inclining the rotor plane, or on the side by modifying the yaw, according to a technique known as wake steering. Wake steering is a control strategy at wind farm scale that generally maximizes the total energy production by coordinating the interactions between turbines. Unlike standard control strategies intended to maximize the performance of individual turbines, wake steering sacrifices the energy production of some turbines so as to obtain a better net performance for the entire wind farm. In addition to production maximization, another goal is to limit or to decrease the structural fatigue of wind turbines. This is an additional compromise between production gain, negative impact in terms of yaw misalignment-related turbine load, and positive impact of wake steering out of the rotors of the turbines located downstream from the misaligned turbines. A positive consequence, in case of advantageous compromise, is the lifetime extension of the turbines and the maintenance cost decrease.

One strategy uses the yaw actuators to misalign the turbines with respect to the incident wind direction, which enables wake steering to limit the impact on the downstream turbines. Finding the optimal yaw angles (maximizing the total electric power of the wind farm while reducing turbine fatigue) is a complex problem.

For this complex problem, conventional control approaches may be considered which use a wind propagation model in a wind park, and they optimize the yaw angles in relation to this approximation. Various models using analytical approximations or numerical calculations have been proposed, but such models however lack precision, because they disregard the turbulent wind dynamics and the wake propagation, thus leading to a poor estimation of the wake effects in wind parks. There are higher-fidelity models that account for wake advection, deflection, meandering and merging, but they are time and computing resources consuming, which discourages their use for real-time optimization.

It is possible to overcome such constraints using model-free methods. Reinforcement learning (RL) is one example thereof: these methods learn by trial and error, and they deduce optimal actions only by observing the responses of a system to input changes. This online learning approach is particularly interesting due to the 4odelling uncertainties that make it necessary to forget in the field some suboptimal behaviors learnt in 4odelling. The combination with a decentralized approach is however not obvious in that decentralized algorithms limit the observability of the problem for each turbine, making their environment non-stationary.

Reinforcement learning methods have also been used for automatic production control via yaw control for a wind park as disclosed in patent application no. FR-22/12,772 which illustrates such a reinforcement learning method. However, this method does not enable an optimal compromise between the energy generated by the wind farm and the fatigue of each turbine in all wind situations (speed and direction).

Furthermore, the method of U.S. Pat. No. 9,201,410 concerns a system and a method for optimizing a wind farm performance indicator, in particular the energy generated by the wind farm, by accounting for the wind farm load. However, this method does not enable an optimal compromise between the energy generated by the wind farm and the fatigue of each turbine in all wind situations (speed and direction).

SUMMARY OF THE INVENTION

The present invention controls a wind farm in real time with a compromise between maximization of the generated energy and reduction of the turbine fatigue, in all wind situations. The invention therefore concerns a wind farm control method implementing an acquisition of a wind speed and direction distribution, an acquisition of the wind speed and direction in real time, a wind farm model and a load model for each wind turbine. Finally, an optimization step allows target operating points to be determined for each turbine in which the optimization step implements optimization of an expected value of the energy generated for the entire wind speed and direction distribution according to an expected value of the load of each turbine for the entire wind speed and direction distribution. These target operating points (target yaw angles for example) are then applied to the turbines of the wind farm. Taking account of the expected value of the speed distribution and the expected value of the wind direction allows determining a compromise between maximization of the generated energy and reduction of the turbine fatigue, in all wind situations. In particular, the invention allows finding a control balance between a wind that is not frequent but may cause high turbine fatigue, and a frequent wind that causes little turbine fatigue.

Furthermore, the invention relates to a wind farm capable of implementing the control method according to the invention.

The invention concerns a wind farm control method in which each turbine of the wind farm comprises an actuator for modifying an operating point of that turbine, notably the yaw angle of the turbine, the yaw angle being the angle formed between a rotor of the wind turbine and a wind direction. For this method, the following steps are carried out:

a. acquiring a wind speed and direction distribution on the site of the wind farm, as well as the wind speed and direction in real time;
b. constructing a wind farm model, the wind farm model relating the wind speed and direction and the operating point of each turbine to a power generated by the wind farm, the wind farm model accounting for a wake effect,
c. for each wind turbine, constructing a load model, the load model relating the wind speed and direction and the operating point of each turbine to the load of at least one component of the turbine;
d. for each wind turbine, determining a target operating point using a method for optimizing the expected value of the power generated by the wind farm determined by the wind farm model for the acquired wind speed and direction distribution, the expected value of the load of each turbine determined by the model of each turbine for the acquired wind speed and direction distribution being a parameter of the cost function of the optimization method to be optimized, or a constraint of the optimization method, and the optimization method accounting for the wind speed and the wind direction in real time; and
e. controlling the operating point of each wind turbine by applying the determined target operating point using the actuator.

According to an embodiment, the operating point is the yaw angle, and the optimization method is constrained by a variation range of the yaw angle of each wind turbine.

According to an implementation, at least one of wind speed and direction distribution and the real-time wind speed and direction are acquired by measurement by use of at least one of a LiDAR sensor, at least one anemometer, and at least one control and data acquisition system.

Advantageously, the optimization method uses a weighted sum of the generated power and of the load.

Advantageously, the optimization method performs an optimization of the generated power under a load-related constraint, notably under the constraint that, for each turbine, the expected value of the load is not greater than the overall nominal load, or under the constraint that, for each turbine, the expected value of the load is not greater than the maximum nominal load of all the turbines.

According to an aspect, the optimization method performs a Lagrangian type solution, with a penalty method, notably using logarithmic barriers, and possibly using the Uzawa algorithm.

According to an embodiment option, the load model determines a damage equivalent load, notably for the blades or the tower of the turbine.

According to an embodiment, the wind farm model is constructed using an aerodynamic model of the wind farm and a wake model.

According to an implementation, the load model is a map previously obtained by aero-hydro-servo-elastic modeling.

Furthermore, the invention concerns a wind farm where each turbine of the wind farm comprises an actuator for modifying an operating point of the turbine, notably the yaw angle of the turbine with the yaw angle being the angle formed between the rotor of the turbine and a wind direction. The wind farm comprises a computer for implementing the wind farm control method according to one of the aforementioned features.

BRIEF DESCRIPTION OF THE DRAWINGS

Other features and advantages of the method according to the invention will be clear from reading the description hereafter of embodiments given by way of non-limitative example, with reference to the accompanying figures wherein.

DETAILED DESCRIPTION OF THE INVENTION

The present invention concerns a method for real-time control of a wind farm. A wind farm, also referred to as wind park or wind power plant, is a site comprising wind turbines that generate electricity. Each turbine of the wind farm comprises an actuator for modifying an operating point of the turbine. An example of an operating point can be the yaw angle of the turbine. Other operating points can notably be speed governing of the turbine, or modifying the power curve of the turbine. The position of the turbines within the wind farm, which are also referred to as wind turbine layout or wind turbine implementation, is previously known.

In the rest of the description, only the yaw angle control is described, other operating points can however be controlled with the method according to the invention.

In the present application, the terms upstream and downstream are defined according to the wind direction (an upstream wind turbine is subjected to the wind before a downstream turbine).

The method according to the invention comprises steps of:

1) Acquisition of a wind speed and direction distribution
2) Construction of a wind farm model
3) Construction of a load model
4) Determination of a target operating point
5) Control of each wind turbine.

Steps 2 to 4 can be carried out by computing capability, notably a computer, a processor or a calculator. The steps are detailed in the description below.

Figure 1:
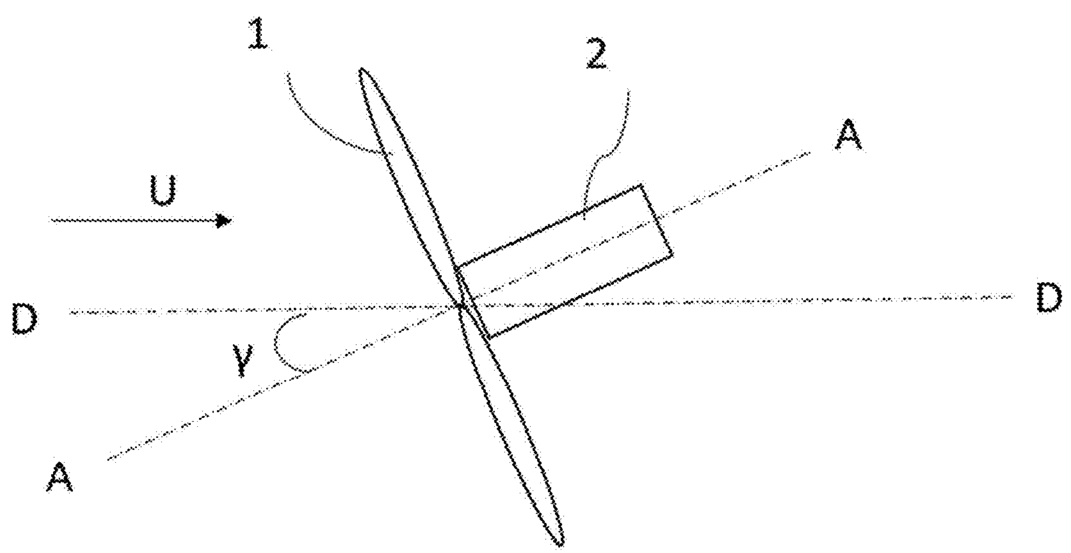
FIG. 1, already described, illustrates the yaw angle of a wind turbine.
Figure 2:
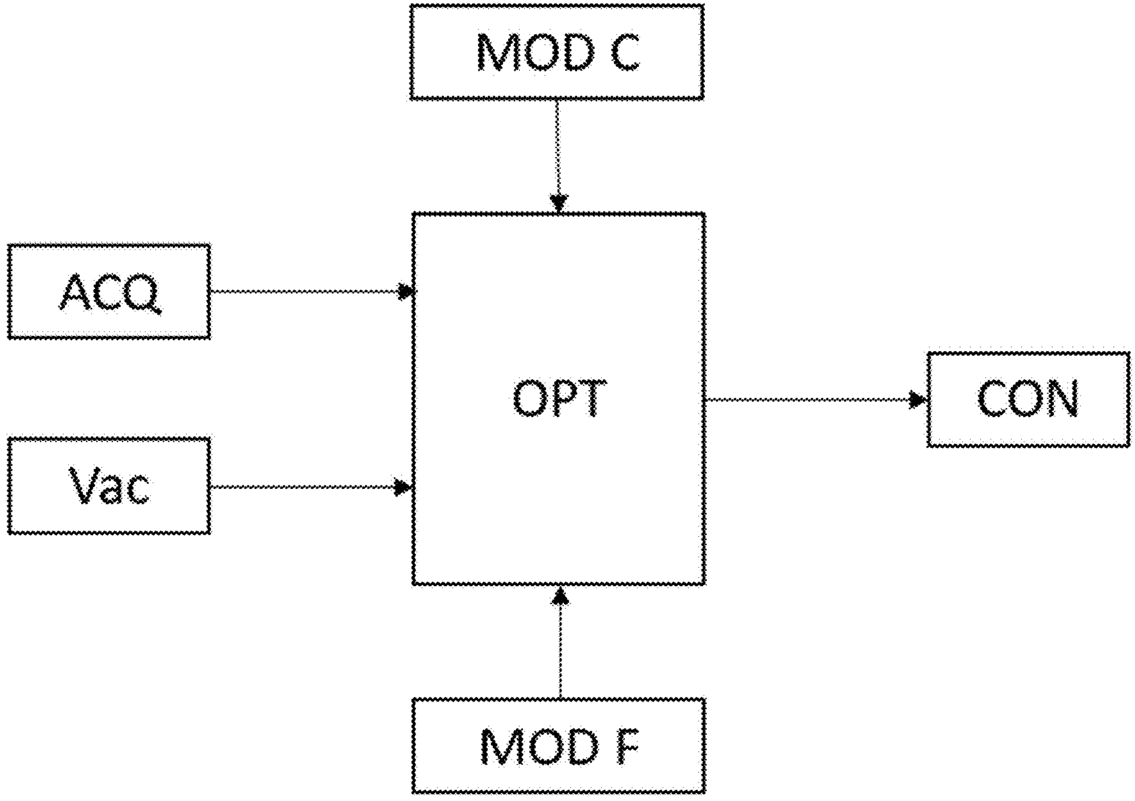
FIG. 2 illustrates the steps of the control method according to an embodiment of the invention.

FIG. 2 schematically illustrates, by way of non-limitative example, the steps of the wind farm control method according to an embodiment of the invention. A distribution of the wind speed and direction on the wind farm site, as well as a current wind speed and direction (Vac), are acquired (ACQ). A wind farm model (MOD F) which determines the energy generated by the wind farm according to the wind speed and direction, and the operating point of each turbine, is constructed. For each turbine, a load model (MOD C) determining the load of each turbine according to the wind speed and direction, and the operating point of each turbine, is constructed. Then, by use of an optimization method (OPT), a target operating point is determined according to the current wind speed and direction (Vac). Optimization (OPT) implements the two models (MOD F, MOD C) and the acquired wind speed and direction distribution (ACQ). The turbines of the wind farm are then controlled (CON) according to the target operating point and to the current wind speed and direction (Vac).

1) Acquisition of a Wind Speed and Direction Distribution

Figure 4:
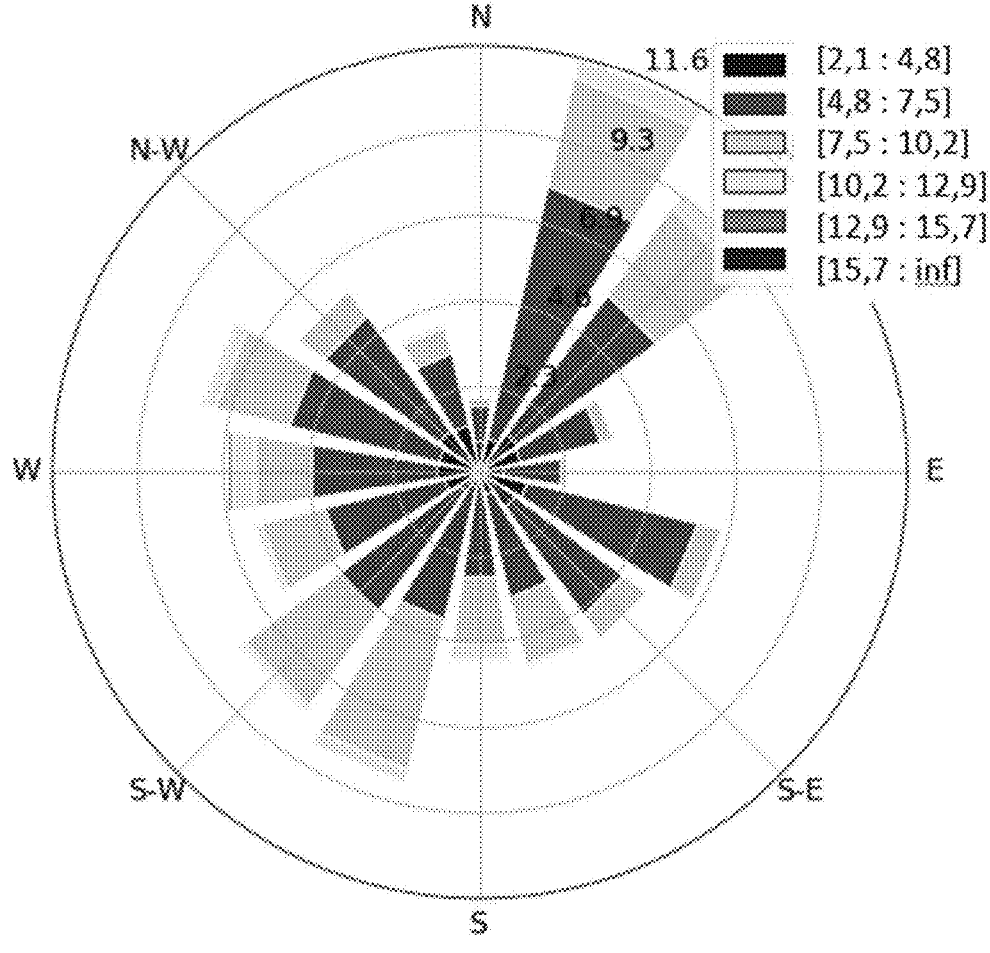
FIG. 4 illustrates a compass rose (speed and direction) for the site of the wind farm of the example of FIG. 3.

This step acquires a wind speed and direction distribution on the site of the wind farm. The wind speed and direction distribution is a wind speed and direction record that can be acquired for a predetermined time, for example at least one year, which accounts for seasonal climate phenomena. The distribution is understood to be a statistical distribution of the wind speed and direction. This distribution can be graphically represented by a polar histogram, also referred to as compass rose. FIG. 4 is an example of a compass rose applied to the example described in the rest of the description. This wind speed and direction distribution allows knowing the occurrences relative to the wind configurations (speed, direction) on the wind farm site, and deducing therefrom probabilities of these wind configurations. In addition, in this step, the current wind speed and direction are acquired. In other words, the wind configuration (speed, direction) is acquired in real time in order to apply real-time control.

According to an aspect of the invention, the data acquisition system can provide statistics relative to quantities of interest, such as the average or the combined standard deviation, periodically obtained and calculated for a predetermined time. According to a non-limitative example, the predetermined period can range from 1 minute to 1 hour which preferably is from 5 minutes to 20 minutes. It is thus possible to acquire average wind speed and direction time series, for a period of time to be defined, over one or more years for example. This data set allows deducing a statistical wind speed and direction distribution, which can be visually represented by a compass rose showing a distribution associated with a classification (binning) of the wind conditions (direction, speed, number of occurrences).

According to an embodiment, the wind speed and direction can be measured (whether for case history or real time), notably by use of at least one of a LiDAR (Light Detection And Ranging) sensor, at least one anemometer, measurements using a real-time control and data acquisition SCADA (Supervisory Control And Data Acquisition) system, or any similar sensor. A real-time control and data acquisition SCADA system is a large-scale remote control system allowing real-time processing of a large number of remote measurements and remote control of the technical facilities. It is an industrial technology in the field of instrumentation, whose implementations can be considered as instrumentation structures including a middleware type layer. The undisturbed wind speed at the wind farm inlet can be deduced from these measurements with the wind farm inlet being defined according to the wind direction.

2) Construction of a Wind Farm Model

This step constructs a wind farm model. The wind farm model connects the upstream wind speed and direction and the operating point of each turbine, and its position in the wind farm, to the power generated by the wind farm. In other words, the wind farm model has the upstream wind speed and direction, the location, the dimension and the operating point of each turbine as the input, and as output the power generated by the wind farm. Furthermore, the wind farm model is representative of the wake effects induced by the operation of the turbines. In other words, the wind farm model allows the wake effect to be modeled. The model thus allows determining the operation of each turbine, even when a turbine is in the wake of an upstream turbine. Thus, this model is representative of the physical phenomena involved within a wind park, in particular aerodynamic and possibly aeroelastic phenomena.

According to an implementation of the invention, the power generated by the wind farm, which is determined by the wind farm model, can be the annual energy production AEP. Thus, the method according to the invention allows optimizing the energy generated by the wind farm over a year, and thereby fully accounting for the seasonal climate variations.

According to an embodiment of the invention, the wind farm model can be constructed using an aerodynamic model of the wind farm, and a wake model. For example, the wind farm model can be constructed by use of a wind park simulator to calculate the aerodynamic characteristics of the wind farm. In particular, modeling of the wind turbines, in particular their rotor, can exploit the geometry and the aerodynamic profile of the blades, and maps of the power and thrust coefficients as a function of the wind speed. The wake model can be included in the wind park simulator to model the aerodynamic interactions of the turbines. The wake model can for example be a super-Gaussian model, or any similar model. A local superposition of the sum of the wakes can then be implemented, by way of non-limitative example, to implement the superposition of the sum of the wakes of several successive turbines.

3) Construction of a Load Model

This step constructs, for each wind turbine, a load model. The load model relates the wind speed and direction, and the operating point of the turbine, to a load of at least one component (for example blades, transmission, actuators or tower, or anchoring and mooring systems for floating turbines) of the turbine. In other words, the load model has the wind speed and direction, and the operating point of the turbine, as inputs, and the turbine load as the output. Loading is understood to be a load on the turbine, this load generating fatigue of the turbine component.

According to an implementation of the invention, the load can be a damage equivalent load DEL. Load DEL can be defined as the amplitude of a sinusoidal load of specified frequency around a specified fixed load average that would impact the capacity of a structure to withstand the evaluated load.

Advantageously, the load model can determine the load DEL of the turbine blades. A representation of the fatigue of the structural elements of interest of the turbine can thus be obtained. As a variant, the load model can determine the load DEL of the tower, or of the transmission, or of the actuators of the turbine. In case of evaluation of floating offshore technologies, the load model can determine the load DEL of the floater, the mooring and anchoring systems of the turbine.

According to an aspect of the invention, the load, in particular load DEL, can be determined by use of a response surface, or of a multidimensional map, preferably synthesized by use of coupled aero-hydro-servo-elastic simulations.

4) Determination of a Target Operating Point

This step determines, using an optimization method, a target operating point (the target yaw angle for example) for each wind turbine. The target operating point corresponds to an operating point setpoint to be applied to the turbine. The optimization method uses the wind farm model constructed in step 2, the load model constructed in step 3, and the wind speed and direction distribution acquired in step 1. The optimization method is therefore applied to the expected value of the generated power determined by the wind farm model for the entire acquired wind speed and direction distribution, as a function of an expected load value of each turbine determined by the load model for the entire acquired wind speed and direction distribution. The expression "as a function of an expected load value" means that the expected load value is a parameter of the cost function to be optimized, or a constraint of the optimization method. It is noted that the expected value of a random variable corresponds to the mean of the possible values weighted by the probabilities associated with these values. The probabilities considered for the expected values correspond to the probabilities resulting from the wind speed and direction distribution. The optimization method thus depends on the expected value of the wind speed and direction distribution. In particular, the invention allows finding a control balance between a wind that is not frequent but may cause high turbine fatigue, and a frequent wind that causes little turbine fatigue. Once optimization is achieved, the target operating point is determined for the acquired current wind (current wind speed and direction).

For the embodiment when the operating point is the yaw angle, the optimization method can be constrained by the yaw angle variation range of each turbine. The yaw angle variation range is understood to be the interval within which the yaw angle can range for each turbine. This variation range is limited by a minimum bound and a maximum bound of the yaw angle. This constraint prevents the method from determining a non-attainable operating point, which ensures faster optimization requiring fewer computing resources, thanks to a limitation of the optimization domain.

Advantageously, the optimization method can concern an optimization problem with discrete probability. Indeed, the optimization problem allows calculation of the optimal yaw angles of the wind farm for all the wind configurations. If denoted by w the random variable of the wind defined by wind speed $w_s$ and wind direction $w_d$, $N_w$ is the number of acquired wind speed and direction data, and $(w_i)_{i=1, \ldots, N_w}$ is the sequence of values of the acquired wind speed and direction data. The relationship is written:

$$\mathbb{P}_w := \sum_{i=1}^{N_w} p_{w_i} \delta_{w_i}$$

with $\mathbb{P}_w$ being the expected value of the production generated by the wind farm, $p_w$ being the probability of occurrence of wind w being (from the distribution) and $\delta_{w_i}$ being the power produced by the wind farm for wind configuration $w_i$.

$\overline{\theta}$ can be defined by:

$$\overline{\theta} = (\overline{\theta}_1, \ldots, \overline{\theta}_{N_w}) := (\theta(w_1), \ldots, \theta(w_{N_w}))$$

with θ being the vector of the yaw setpoints for the turbines of the wind farm. The expected value of function f can then be defined as:

$$\mathbb{E}_w f(\theta(w)) := \sum_{i=1}^{N_W} p_{w_i} f(\overline{\theta}_i)$$

with $\mathbb{E}_w\varphi$ being the expected value of φ being with respect to random variable w.

According to an implementation of the invention, the solution of the optimization method can be in Lagrangian form, with a constraint penalty method, notably using logarithmic barriers, or any similar penalty method. In addition, the solution can be obtained by use of the Uzawa algorithm (which is a fixed-step projected gradient algorithm for iteratively solving a dual problem), or any similar algorithm.

According to a first embodiment of the invention, the optimization method can be, based on a weighted sum of the generated power (determined by the wind farm model) and of the load (determined by the load model).

According to an example of this first embodiment, the weighted sum optimization model can concern the solution of the following problem:

$$\min_\theta \mathbb{E}_w J_{WS}(\theta(w), \alpha(w)) := \mathbb{E}_w\left[-\alpha(w)\frac{P(\theta(w), w)}{\mathbb{E}_w P(0, w)} + (1-\alpha(w))\sum_{i=1}^{N_T}\frac{(F(\theta(w), w))_i}{\mathbb{E}_w \sum_i (F(0, w))_i}\right]$$

under the following constraint:

$$\theta(w) \in [\theta^-, \theta^+]^{N_T}, \forall w$$

with w being the random wind variable defined by wind speed $w_s$ being wind direction $w_d$, being $\mathbb{E}_w\varphi$ the expected value of φ being with respect to random variable w, θ being the vector of the yaw setpoints for the turbines of the wind farm, $\theta^-$ and $\theta^+$ being the minimal and maximal yaw variation bounds, 0 corresponding to no yaw misalignment of the turbines of the wind farm, $J_{WS}$ being the weighted sum of the two objective functions, P being the power produced by the wind farm, t being the index of the turbine in the farm, $N_T$ being the number of turbines in the wind farm, F being the load of the turbine, and a being the weighting function ranging between 0 and 1, and set to the maximum value allowing to satisfy:

$$\mathbb{E}_w \sum_t (F(\theta^*(w), w))_t \le E_w \sum_t (F(0, w))_t$$

with θ* being the operating point (the yaw angle for example) solution to the optimization problem. Such a formulation allows obtaining a bi-objective optimization problem, expressed as a single objective, by a standard approach of the weighted-sum scalarization.

According to an embodiment option, the constraints of this optimization problem can be treated by use of logarithmic-barriers. It can then be written:

$$\min_{\bar\theta}\sum_t p_{w_i} J_{WS,\epsilon}(\overline{\theta}_i, \alpha(w_i)) := \sum_{i=1}^{N_W}\left[p_{w_i}\left(-\alpha(w_i)\frac{P(\overline{\theta}_i, w_i)}{P_n} + (1-\alpha(w_i))\sum_{t=1}^{N_T}\frac{(F(\overline{\theta}_i, w_i))_t}{F_n}\right) - \epsilon\sum_{t=1}^{N_T}\log((\overline{\theta}_i)_t - \theta^+) + \log(\theta^- - (\overline{\theta}_i)_t)\right]$$

$$:= \sum_{i=1}^{N_T} J^i_{WS,\epsilon}(\overline{\theta}_i, \alpha(w_i))$$

$$P_n := \mathbb{E}_w P(0, w) = \sum_{i=1}^{N_W} p_{w_i} P(0, w_i)$$

$$F_n := \mathbb{E}_w \sum_t (F(0, w))_t = \sum_{i=1}^{N_W} p_{w_i} \sum_t (F(0, w_i))_t$$

It appears that this problem is separable in the domain of $\overline{\theta}_i$. The problems obtained are then independent and they can be solved in parallel.

According to a second embodiment, the optimization method can implement an optimization of the expected value of the generated power for the entire wind speed and direction distribution under constraint related to the expected value of the load for the entire wind speed and direction distribution.

According to a first variant of this second embodiment, the optimization method can be a maximization of the expected value of the generated power for the entire wind speed and direction distribution under the constraint that, for each turbine, the expected load value is not greater than the expected value of the nominal load (which corresponds to the load without turbine yaw misalignment). It can then be written:

$$\max_\theta \mathbb{E}_w P(\theta(w), w)$$

under the following constraints:

$$\mathbb{E}_w F(\theta(w), w) \le \mathbb{E}_w F(0, w)$$

$$\theta(w) \in [\theta^-, \theta^+]^{N_T}, \forall w$$

with w being the random wind variable defined by wind speed $w_s$ being wind direction $w_d$, $\mathbb{E}_w\varphi$ being the expected value of φ with respect to random variable w, θ being the vector of the yaw setpoints for the turbines of the wind farm, $\theta^-$ and $\theta^+$ being the minimal and maximal yaw variation bounds, 0 corresponding to no yaw misalignment of the turbines of the wind farm, P being the power produced by the wind farm, $N_T$ being the number of turbines in the wind farm, and F being the load of the turbine.

These constraints limit the allowable load level to the nominal level (which corresponds to the load without yaw misalignment of the turbines) for each turbine of the farm considered individually.

For this first variant of the second embodiment, a solution using logarithmic barriers can be implemented. The constraints can be treated in a duality context. The logarithmic barriers may not be used for the load constraints because it may be difficult to initialize the yaw angles in such a way that the constraints are strictly satisfied. The penalized Lagrangian $L_\epsilon$ can be defined as follows:

$$L_\epsilon(\overline{\theta}, \lambda) := \sum_t^{N_W}\left[p_{w_i}\left(-P(\overline{\theta}_i, w_i) + \lambda^T\left[F(\overline{\theta}_i, w_i) - F(0, w_i)\right]\right) - \epsilon\sum_{t=1}^{N_T}\log\left((\overline{\theta}_i)_t - \theta^+\right) + \log\left(\theta^- - (\overline{\theta}_i)_t\right)\right]$$

with λ being the Lagrange multiplier. The duality-based conventional Uzawa algorithm can then be used to solve this problem.

An innovative feature of the use of the Uzawa algorithm in the context of the invention is that updating the weighting table $\lambda^T$ can be done according to the expected score of the load (DEL for example) obtained with the last iteration. In particular, parameter table $\lambda^T$ can be obtained from a set of linear functions of the differences between the DEL scores obtained with the optimization and the nominal DEL scores. These differences are obtained upon each iteration of the algorithm, for the wind distribution studied, that is:

$$\lambda \leftarrow \max\left\{0; \sum_i p_{w_i}\left[F(\overline{\theta}_i, w_i) - F(0, w_i)\right]\right\}$$

According to a second variant of this second embodiment, the optimization method can be a maximization of the expected value of the generated power for the entire wind speed and direction distribution, under the constraint that, for each turbine, the expected load value is not greater than the expected value of the maximum nominal load, for all the turbines (which corresponds to the maximum load of one of the turbines of the wind farm without yaw misalignment of the turbines). It can then be written:

$$\max_\theta \mathbb{E}_w P(\theta(w), w)$$

under the following constraints:

$$\mathbb{E}_w F(\theta(w), w) \le \max_t(\mathbb{E}_w F(0, w))_t$$

$$\theta(w) \in [\theta^-, \theta^+]^N, \forall w$$

with w being the random variable of the wind defined by wind speed $w_s$ and wind direction $w_d$, $\mathbb{E}_w\varphi$ being the expected value of φ with respect to random variable w, θ being the vector of the yaw setpoints for the turbines of the wind farm, $\theta^-$ and $\theta^+$ being the minimal and maximal yaw variation bounds, 0 corresponding to no yaw misalignment of the turbines of the wind farm, P being the power produced by the wind farm, $N_T$ being the number of turbines in the wind farm, and F being the load of the turbine.

For this second variant of the second embodiment, a solution using logarithmic barriers can be implemented. The constraints can be treated in a duality context. The logarithmic barriers may not be used for the load constraints because it may be difficult to initialize the yaw angles in such a way that the constraints are strictly satisfied. In other words, for a given wind configuration (speed and direction), when wake steering is applied, the expected load value cannot be above a given level. This given level is the one reached by the turbine undergoing the highest structural fatigue under standard operating conditions, that is the turbine has the maximum expected load value for the same wind configuration.

Then value F+ can be introduced such that:

$$F^+ := \max_t \mathbb{E}_w F(0, w) = \max_t \sum_{i=1}^{N_w} p_{w_i} F(0, w_i)_t$$

The Lagrangian $\ell_\epsilon$ can then be written:

$$\ell_\epsilon(\overline{\theta}, \lambda) := \sum_i^{N_w}\left[p_{w_i}\left(-P(\overline{\theta}_i, w_i) + \lambda^T\left[F(\overline{\theta}_i, w_i) - F^+\right]\right) - \epsilon\sum_{t=1}^{N_T}\log\left((\overline{\theta}_i)_t - \theta^+\right) + \log\left(\theta^- - (\overline{\theta}_i)_t\right)\right]$$

The conventional duality-based Uzawa algorithm can then be used to solve this problem.

5) Control of Each Wind Turbine

This step controls each wind turbine by applying the target yaw angle (or the target operating point) determined in step 4. In this step, for each turbine, the actuator of the operating point of the turbine is controlled. Notably, the actuator of the turbine yaw angle can be controlled.

According to an embodiment, control of the yaw angle can correspond to a control at a precise value of the yaw angle.

Furthermore, the invention concerns a wind farm. Each turbine of the wind farm comprises an actuator for modifying the yaw angle of the turbine or the operating point of the turbine. Moreover, the wind farm comprises computing capability, notably a computer, a processor or a calculator for carrying out the calculation steps of the control method according to any one of the variants or variant combinations described below. The wind farm is thus controlled by the computing capability. In particular, the computing means allow to:

- acquire the wind speed and direction distribution
- construct and implement a wind farm model
- construct and implement a load model (notably fatigue equivalent)
- carry out an optimization method to determine for each turbine a target operating point, and
- control the yaw angle of each wind turbine or the operating point.

The computing capability can be centralized: the wind farm comprises a single computer for carrying out the steps of the control method, which communicates at a minimum with all the yaw angle actuators. Alternatively, each turbine comprises a computer, and all the computers communicate with each other.

According to an embodiment, the wind farm can comprise a wind sensor, notably a LiDAR sensor or an anemometer.

According to an aspect of the invention, the wind farm can comprise SCADA measuring means.

According to an embodiment option, the wind farm can comprise communication means, notably intended to at least one of transmitting data acquired in step 1 and communicating the target yaw angles to the controllers.

Example

Other features and advantages of the method according to the invention will be clear from reading the application example hereafter.

Figure 3:
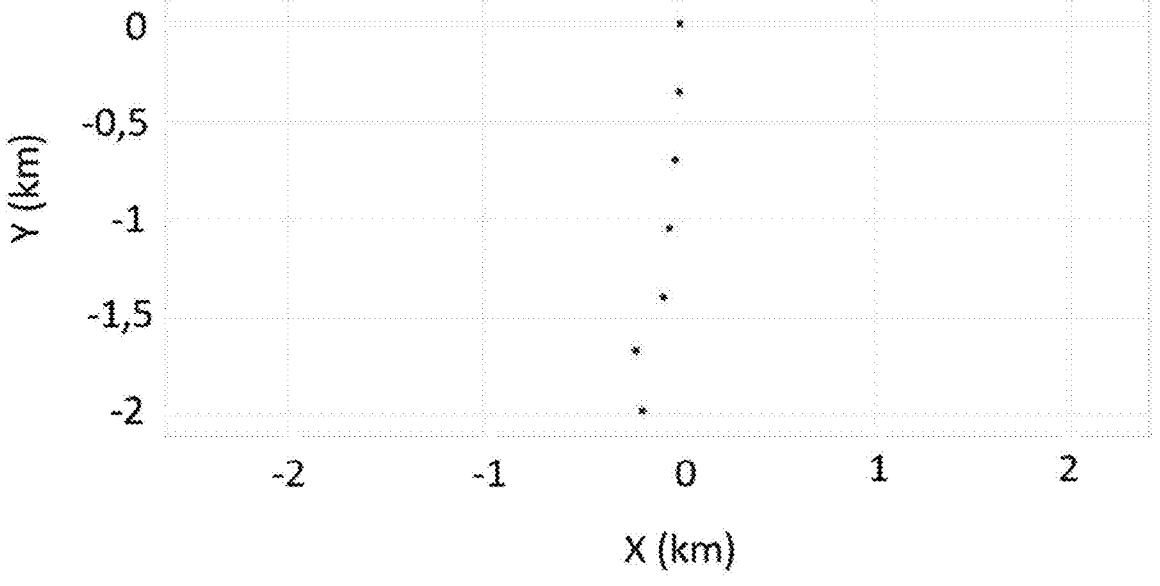
FIG. 3 illustrates, for one example, an implementation of a wind farm.

For this example, a wind farm is considered comprising seven turbines. FIG. 3 illustrates the implementation of the turbines by points, in a (X,Y) system in km. This nearly-aligned layout of the turbines generates a great wake effect. The turbines of this farm have an 82-m diameter rotor, and a nominal power of 2 MW. Furthermore, wind speed and direction measurements are acquired during two years (2017 and 2018). These measurements are obtained by SCADA data of the wind farm. These wind speed and direction measurements allowing determining the wind distribution in form of a compass rose as illustrated in FIG. 4. In this figure, for each wind direction (expressed in a cardinal system), we have a triangle whose height illustrates the occurrence of this wind direction during the measurement period (in other words, the larger the triangle, the more this wind direction has been measured during the measurement period). In addition, each wind direction is divided into several grey level portions to illustrate the wind speed distribution. Thus, each triangle portion corresponds to a wind speed. The wind speed scale is given in the figure in m/s.

For simulations, a wind park simulator using a BEM (Blade Element Momentum) code to calculate the aerodynamic characteristics is utilized. Modeling of the turbines, in particular their rotors, exploit the geometry and the aerodynamic profile of the blades, and maps of the power and thrust coefficients as a function of wind speed. The wind park simulator also models aerodynamic interactions of the turbines which are the wake effects. The wake model is a super-Gaussian model: the parameters of this super-Gaussian wake are a function of the ambient turbulence intensity and of the turbine operating point defining the thrust coefficient. A local superposition of the linear sum of the wakes is used to implement the superposition of the wake effects of several successive turbines. The wake deflection related to a yaw misalignment of a turbine with respect to the average wind direction is represented by the Jimenez model.

In order to determine the damage equivalent loads (DEL), a model including a multidimensional (6D and 5D) mapped surface has been developed. The DEL load model thus is a response surface resulting from a parametric study of the fatigue at the blade root. This analysis depends on the wind speed, the yaw angle, the turbulence intensity, the overlap ratio of the downstream turbine with the imprint of the upstream turbine, the distance between the upstream turbine and the downstream turbine, and a generation of random signals with distinct seeds to perform several independent realizations. The approach was implemented using high-fidelity aero-hydro-servo-elastic modeling tools (DEEPLINES WIND™ or FAST™ for example) to inform the multi-dimensional response surface.

Several criteria are defined for this example:

$$AEP(\theta) := 8760 \cdot \mathbb{E}_w P(\theta(w), w)$$

the annual energy production AEP:

the annual energy production gain:

$$\text{Gain } AEP(\theta)\,[\%] := 100(AEP(\theta) - AEP(0))/AEP(0)$$

corresponding to $(P(\overline{\theta}_i, w_i) - P(0_l, w_i)/P(0, w_i)$, with $\theta_l$ the optimal yaw angle for wind configuration $w_i$, the DEL load optimization gain:

$$\text{Gain } DEL(\theta)\,[\%] := 100\left(\sum_t \mathbb{E}_w(F(\theta(w), w))_t - \mathbb{E}_w(F(0, w))_t\right) / \sum_t \mathbb{E}_w(F(0, w))_t$$

the damage ratio:

$$\frac{D_1}{D_2} = \left(\frac{DEL_1}{DEL_2}\right)^m,$$

with m the Wöhler coefficient, which is 4 for the blade, or 10 for the tower.

For this example, the following optimizations are applied:

- an optimization of the prior art without turbine yaw misalignment, denoted by NOM,
- an optimization of only the generated power according to the prior art with turbine yaw misalignment, regardless of fatigue, denoted by AA,
- an optimization according to the first embodiment of the invention, denoted by INV1,
- an optimization according to the first variant of the second embodiment of the invention, denoted by INV2, and
- an optimization according to the second variant of the second embodiment of the invention, denoted by INV3.

Figure 5:
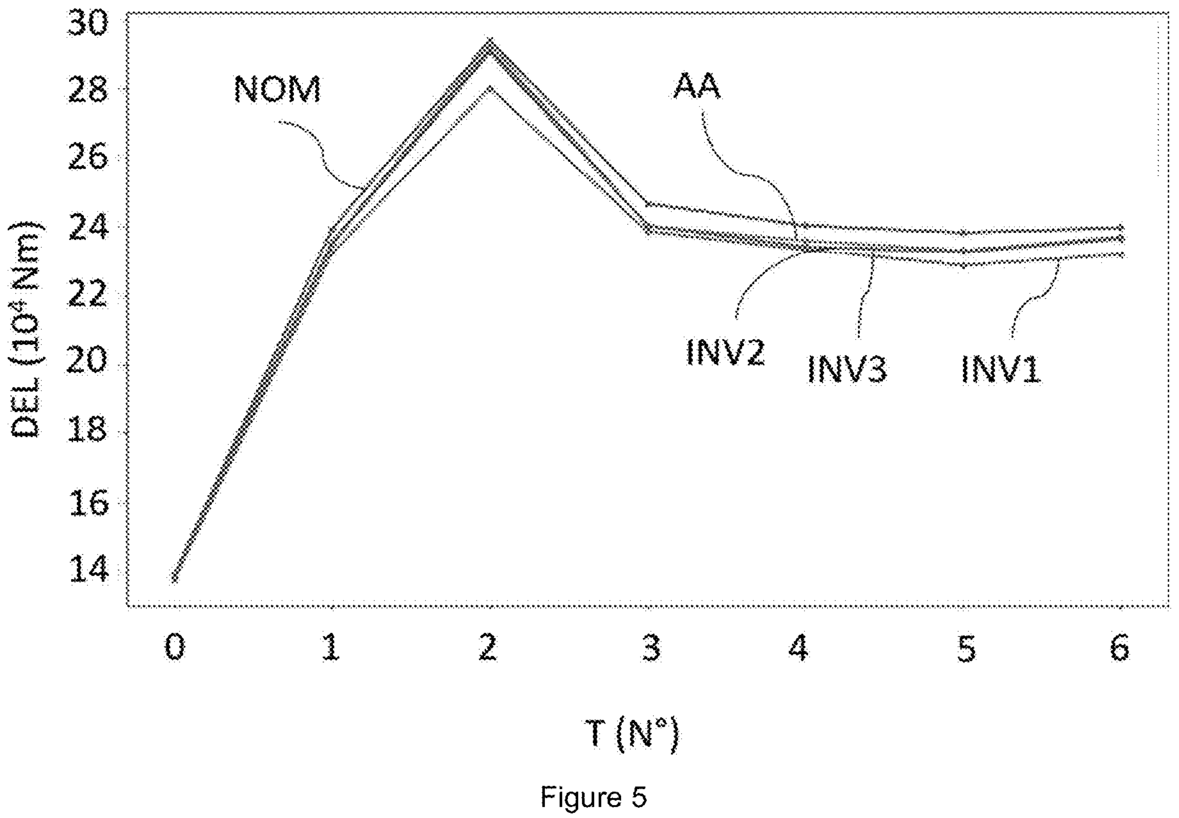
FIG. 5 is a graph of the load DEL for each wind turbine for the example of FIGS. 3 and 4 with the load being respectively a nominal load, a load determined by use of a method of the prior art that does not account for the load DEL, and three loads determined by three embodiments of the method according to the invention.

FIG. 5 illustrates the load value DEL in Nm for each turbine T numbered from 0 to 6. It is noted that, whatever the embodiment of the invention, the method according to the invention allows reducing the load, therefore the fatigue, of six of the seven turbines of the wind farm.

Table 1 compares the method according to the invention in relation to the nominal case.

TABLE 1

| Gains | Optimization INV1 | Optimization INV2 | Optimization INV3 |
|---|---|---|---|
| AEP (%) | 0.925 | 1.105 | 1.104 |
| DEL (%) | −3.330 | −1.764 | −1.847 |
| Damage ratio (%) | 28 | 16 | 17 |

The two embodiments of the invention allow increasing the power generated by the wind farm, while reducing load DEL on the turbine blades, with an improved damage ratio. Thus, the method according to the invention allows increasing the energy production while limiting fatigue of the wind turbines.

The invention claimed is:

1. A wind farm method of control of turbines of the wind farm including an actuator for modifying an operating point of a yaw angle of the turbines, wherein the yaw angle is formed between a rotor of each wind turbine and a wind direction of wind blowing on the wind farm comprising:

a. acquiring a wind speed and wind direction distribution of a site of the wind farm in real time;

b. constructing a wind farm model, the wind farm model relating the wind speed and the wind direction and the operating point of each turbine for power generated by the wind farm in which the wind farm model accounting for a wake effect;

c. constructing for each wind turbine a load model, the load model relating the wind speed and wind direction and the operating point for each turbine to a load on at least one component of the turbine;

d. determining for each wind turbine, a target operating point which optimizes an expected value of power generated by the wind farm determined by the wind farm model for the acquired wind speed and the acquired wind direction distribution, the expected value of the load on each turbine which is determined by the load model of each turbine for the acquired wind speed and acquired direction distribution which is a parameter of a cost function of an optimization method to be optimized or a constraint of the method which optimizes an optimization method accounting for the wind speed and the wind direction in real time; and e. controlling the target operating point of each wind turbine by applying the determined target operating point to the actuator for modifying the yaw angle of the turbine.

2. A method as claimed in claim 1, wherein the optimization method is constrained by a variation range of the yaw angle of each wind turbine.

3. A method as claimed in claim 2, wherein at least one of a wind speed and wind direction distribution, the real-time wind speed and wind direction are acquired by measurement using at least one of a LiDAR sensor, at least one anemometer, and at least one control and data acquisition system.

4. A method as claimed in claim 3, wherein the optimization method performs a Lagrangian solution using a penalty method, based on at least one of logarithmic barriers and a Uzawa algorithm.

5. A method as claimed in claim 2, wherein the optimization method uses a weighted sum of the generated power of the wind farm and of the load on at least one component of the turbine.

6. A method as claimed in claim 2, wherein the optimization method performs an optimization of the power generated depending on a load-related constraint for each turbine, wherein an expected value of the load is not greater than an overall nominal load, or under a constraint for each turbine, the expected value of the load is not greater than a maximum nominal load of all the turbines.

7. A method as claimed in claim 2, wherein the optimization method performs a Lagrangian solution using a penalty method, based on at least one of logarithmic barriers and a Uzawa algorithm.

8. A wind farm including wind turbines wherein each turbine of the wind farm comprises an actuator for modifying an operating point of the turbine including a yaw angle of the turbine, the yaw angle being an angle formed between a rotor of the turbine and a wind direction at the wind farm and the wind farm comprises a computer which implements a wind farm control method as claimed in claim 2.

9. A method as claimed in claim 1, wherein at least one of a wind speed and wind direction distribution, the real-time wind speed and wind direction are acquired by measurement using at least one of a LiDAR sensor, at least one anemometer, and at least one control and data acquisition system.

10. A method as claimed in claim 9, wherein the optimization method performs optimization of the generated power using a load-related constraint for each turbine, wherein an expected value of the load which is not greater than the overall nominal load, or under a constraint for each turbine, the expected value of the load is not greater than a maximum nominal load of all the turbines.

11. A method as claimed in claim 9, wherein the optimization method performs a Lagrangian solution using a penalty method, based on at least one of logarithmic barriers and a Uzawa algorithm.

12. A method as claimed in claim 9, wherein for each turbine, the load model determines an equivalent damage load on one blade of the turbine and a tower of the turbine.

13. A wind farm including wind turbines wherein each turbine of the wind farm comprises an actuator for modifying an operating point of the turbine including a yaw angle of the turbine, the yaw angle being an angle formed between a rotor of the turbine and a wind direction at the wind farm and the wind farm comprises a computer which implements a wind farm control method as claimed in claim 9.

14. A method as claimed in claim 1, wherein the optimization method uses a weighted sum of the power generated by the wind farm and the load.

15. A method as claimed in claim 1, wherein the optimization method uses a weighted sum of the generated power of the wind farm and of the load on at least one component of the turbine.

16. A method as claimed in claim 1, wherein the optimization method performs optimization of the power generated depending on a load-related constraint for each turbine, wherein an expected value of the load is not greater than an overall nominal load, or under a constraint for each turbine, the expected value of the load is not greater than a maximum nominal load of all the turbines.

17. A method as claimed in claim 1, wherein the optimization method performs a Lagrangian solution using a penalty method, based on at least one of logarithmic barriers and a Uzawa algorithm.

18. A method as claimed in claim 1, wherein for each turbine, the wind farm model is constructed using an aerodynamic model of the wind farm and a wake model.

19. A method as claimed in claim 1, wherein the load model comprises a previous map obtained using aero-hydro-servo-elastic modeling.

20. A wind farm including wind turbines wherein each turbine of the wind farm comprises an actuator for modifying an operating point of the turbine including a yaw angle of the turbine, the yaw angle being an angle formed between a rotor of the turbine and a wind direction at the wind farm and the wind farm comprises a computer which implements a wind farm control method as claimed in claim 1.

* * * * *